(12) United States Patent
Baghel et al.

(10) Patent No.: US 11,206,641 B2
(45) Date of Patent: Dec. 21, 2021

(54) TECHNIQUES FOR MANAGING FEEDBACK IN SIDELINK COMMUNICATIONS

(71) Applicant: QUALCOMM Incorporated, San Diego, CA (US)

(72) Inventors: Sudhir Kumar Baghel, Hillsborough, NJ (US); Kapil Gulati, Hillsborough, NJ (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 16/829,758

(22) Filed: Mar. 25, 2020

(65) Prior Publication Data

US 2020/0314832 A1 Oct. 1, 2020

Related U.S. Application Data

(60) Provisional application No. 62/826,409, filed on Mar. 29, 2019.

(51) Int. Cl.
*H04W 72/04* (2009.01)
*H04W 88/04* (2009.01)
*H04W 76/14* (2018.01)

(52) U.S. Cl.
CPC ..... *H04W 72/0406* (2013.01); *H04W 72/048* (2013.01)

(58) Field of Classification Search
None
See application file for complete search history.

(56) References Cited

U.S. PATENT DOCUMENTS

2020/0029318 A1\* 1/2020 Guo .......... H04W 4/40
2020/0305126 A1\* 9/2020 Li ............ H04W 72/02

FOREIGN PATENT DOCUMENTS

WO 2016163972 A1 10/2016
WO 2017103662 A1 6/2017

OTHER PUBLICATIONS

Ericsson: "Configuration and Signalling Principles for NR Sidelink", 3GPP Draft, 3GPP TSG-RAN WG1 Meeting #95, R1-1813654 Ericsson—Configuration and Signalling Principles for NR Sidelink, 3rd Generartion Partnership Project (3GPP), Mobile Competence Centre, 650, Route Des Lucioles, F-06921 Sophi, vol. RAN WG1, No. Spokane, WA, USA, Nov. 12, 2018-Nov. 16, 2018, Nov. 11, 2018 (Nov. 11, 2018), XP051555712, 5 pages.

(Continued)

*Primary Examiner* — Hong S Cho
(74) *Attorney, Agent, or Firm* — Arent Fox LLP

(57) ABSTRACT

Aspects described herein relate to selecting a sidelink control information (SCI) format for indicating a minimum communication range parameter, where the SCI format is a common format defined for requesting both location-based feedback and signal strength-based feedback. SCI indicating a value for the minimum communication range parameter can be generated based on the SCI format. The SCI indicating the value for the minimum communication range parameter can be transmitted to one or more devices.

30 Claims, 7 Drawing Sheets

(56) References Cited

OTHER PUBLICATIONS

Intel Corporation: "Sidelink Feedback Information and Signalling for Wearable and IoT Use Cases", 3GPP Draft, 3GPP TSG RAN WG1 Meeting #90, R1-1712521 Intel—Fed2D SL-FB, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051315337, 5 pages.
International Search Report and Written Opinion—PCT/US2020/025021—ISAEPO—dated Jun. 18, 2020.

* cited by examiner

TECHNIQUES FOR MANAGING FEEDBACK IN SIDELINK COMMUNICATIONS

CLAIM OF PRIORITY UNDER 35 U.S.C. § 119

The present Application for Patent claims priority to Provisional Application No. 62/826,409, entitled "TECHNIQUES FOR MANAGING FEEDBACK IN SIDELINK COMMUNICATIONS" filed Mar. 29, 2019, which is assigned to the assignee hereof and hereby expressly incorporated by reference herein for all purposes.

BACKGROUND

Aspects of the present disclosure relate generally to wireless communication systems, and more particularly, to transmitting feedback in sidelink communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Some wireless communication networks include vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. In V2X, devices can communicate with one another over resources of a sidelink channel. Devices receiving sidelink communications can report feedback for the sidelink communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes selecting a sidelink control information (SCI) format for indicating a minimum communication range parameter, where the SCI format is a common format defined for requesting both location-based feedback and signal strength-based feedback, generating, based on the SCI format, SCI indicating a value for the minimum communication range parameter, and transmitting, to one or more devices, the SCI indicating the value for the minimum communication range parameter.

In another example, a method for wireless communication is provided. The method includes receiving, from a device, SCI that is of a SCI format for indicating a minimum communication range parameter, where the SCI format is a common format defined for requesting both location-based feedback and signal strength-based feedback, and where the SCI indicates a minimum communication range parameter, determining whether to measure a location with respect to the device or a received signal strength of the device, determining, based at least in part on comparing the location or the received signal strength to the minimum communication range parameter, to transmit feedback to the device, and transmitting the feedback to the device.

In another example, a method for wireless communication is provided that includes generating a configuration indicating whether a minimum communication range parameter in SCI corresponds to a location-based value or a signal strength-based value, and transmitting the configuration to one or more UEs.

In another example, an apparatus for wireless communication is provided that includes a transceiver, a memory configured to store instructions, and one or more processors communicatively coupled with the transceiver and the memory. The one or more processors are configured to select a SCI format for indicating a minimum communication range parameter, wherein the SCI format is a common format defined for requesting both location-based feedback and signal strength-based feedback, generate, based on the SCI format, SCI indicating a value for the minimum communication range parameter, and transmit, to one or more devices, the SCI indicating the value for the minimum communication range parameter.

In another example, an apparatus for wireless communication is provided that includes a transceiver, a memory configured to store instructions, and one or more processors communicatively coupled with the transceiver and the memory. The one or more processors are configured to receive, from a device, SCI that is of a SCI format for indicating a minimum communication range parameter, wherein the SCI format is a common format defined for requesting both location-based feedback and signal strength-based feedback, and wherein the SCI indicates the minimum communication range parameter, determine whether to measure a location with respect to the device or a received signal strength of the device, determine, based at least in part on comparing the location or the received signal strength to a value of the minimum communication range parameter, to transmit feedback to the device, and transmit the feedback to the device.

In a further examples, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
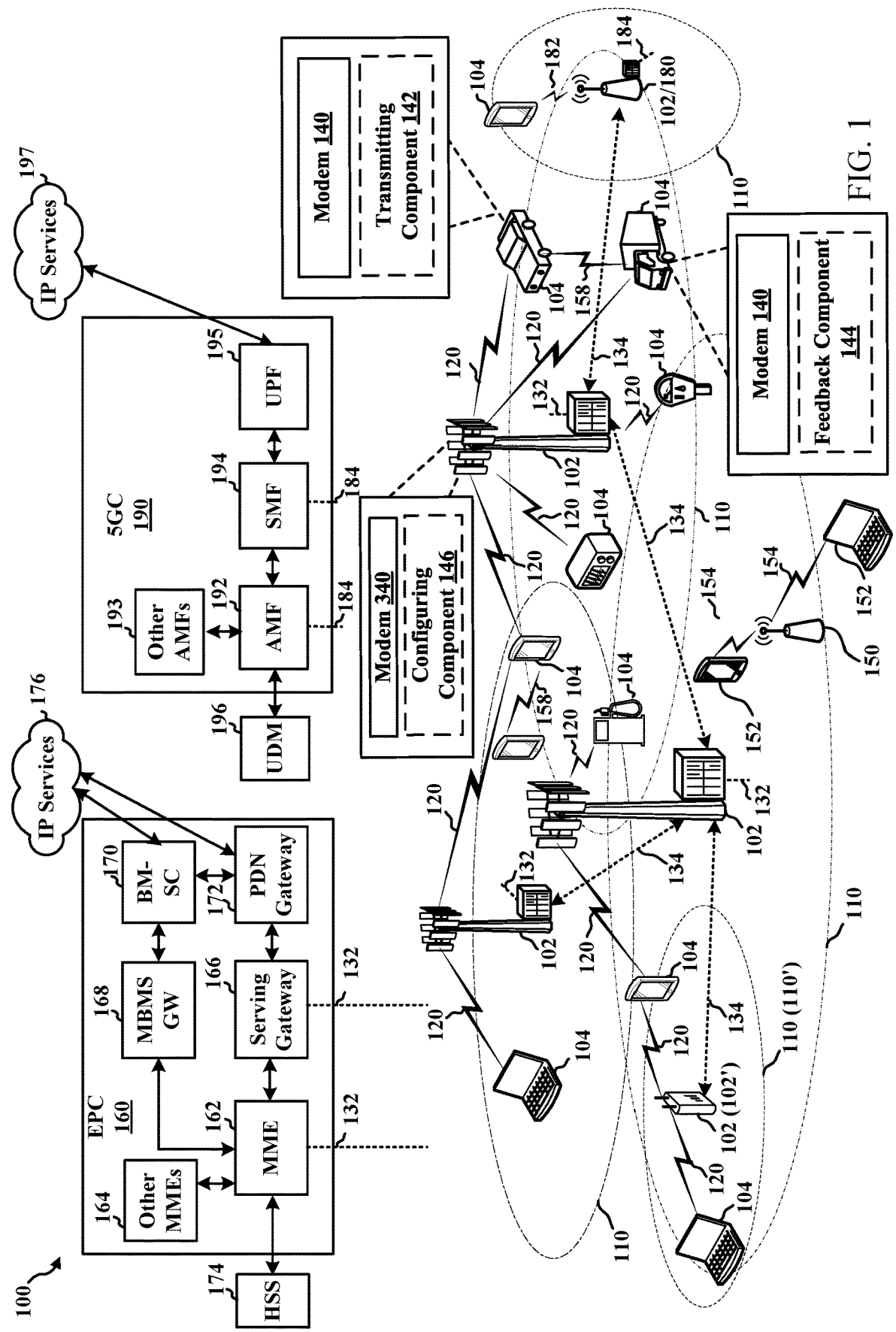
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to managing feedback for sidelink channel communications enabled for device-to-device (D2D) communications. As such, the concepts described herein, though sometimes described specifically for vehicle-to-anything (V2X) communications, can be applied to substantially any D2D communication technologies. For example, D2D communication technologies can include vehicle-to-vehicle (V2V) communications, vehicle-to-infrastructure (V2 I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a sidelink channel. Continued support and implementation of V2X communications is provided in fifth generation (5G) new radio (NR) communication technologies, as well as long term evolution (LTE). Though aspects are generally described herein in terms of D2D/V2X communications, the concepts and techniques can be similarly applied more generally to substantially any type of wireless communications.

In an example, devices receiving sidelink communications from a transmitting device can transmit feedback for the sidelink communications to the transmitting device, but only devices within a certain communication range of the transmitting device may transmit feedback, as receiving feedback from every device that receives the sidelink communications may not be necessary and may use undue network resources. In addition, devices may send feedback for non-acknowledgement (NACK) only. Using such strategies for transmitting feedback can conserve network resources, improve overall system efficiency and reliability of message reception by UEs in the certain communication range, etc. In one example, for determining the communication range for reporting feedback for sidelink groupcast, the network may support using location-based considerations (e.g., transmit (TX)-receive (RX) distance) and/or signal strength-based considerations (e.g., reference signal received power (RSRP), reference signal received quality (RSRQ), received signal strength indicator (RSSI), signal-to-noise ratio (SNR), etc.). In other words, a receiving device may decide whether to send feedback to a transmitting device for received groupcast communications based on location-based and/or signal strength-based considerations. Both considerations have advantages and disadvantages in certain scenarios, as described herein, and thus aspects described herein relate to allowing specifying of an indication of whether to use location-based and/or signal strength-based considerations in determining whether to transmit feedback for sidelink communications.

In one example, a single sidelink control information (SCI) format can be defined for the receiving device to use in indicating location-based and/or signal strength-based feedback. In addition, for example, a parameter can be configured to indicate whether a minimum communication range parameter in SCI transmitted based on the SCI format is to be interpreted in terms of a location-based value (e.g., number of zones or configured quantized step size, such as a number of meters, etc.) or signal strength-based value (e.g., RSRP, RSRQ, RSSI, SNR, etc.). Additionally, in an example, where the configured parameter indicates a location-based value for the minimum communication range parameter, a separate signal strength threshold can be configured as an additional parameter to measure in determining whether to transmit feedback for the sidelink communications. Thus, in one example, when minimum communication range parameter is interpreted as signal strength-based value (e.g., RSRP, RSRQ, RSSI, SNR, etc.) in that case a location parameter/field in SCI may not be used (e.g., to represent the location of the UE). In another example, when minimum communication range is interpreted as location-based value, both location parameter/field and minimum communication range parameter/field can be utilized by receiver to determine whether to transmit feedback.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over a sidelink channel of communication link 158) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving. For example, sidelink V2X communications may occur in a dedicated portion of spectrum such as the 5.9 GHz dedicated short range communications (DSRC) bandwidth reserved for vehicle communications.

In aspects described herein, UE 104 can include a modem 140 for communicating with other UEs and/or base stations in a wireless network. UE 104 can also include a transmitting component 142 for transmitting sidelink communications to other UEs 104. UE 104 and/or other UEs 104 may include a modem 140 and a feedback component 144 for transmitting feedback for the sidelink communications. A base station 102 may include a modem 340 for communicating with one or more UEs 104 and/or a configuring component 146 for indicating one or more configurations of parameters to use in determining whether to transmit feedback for sidelink communications.

Figure 2:
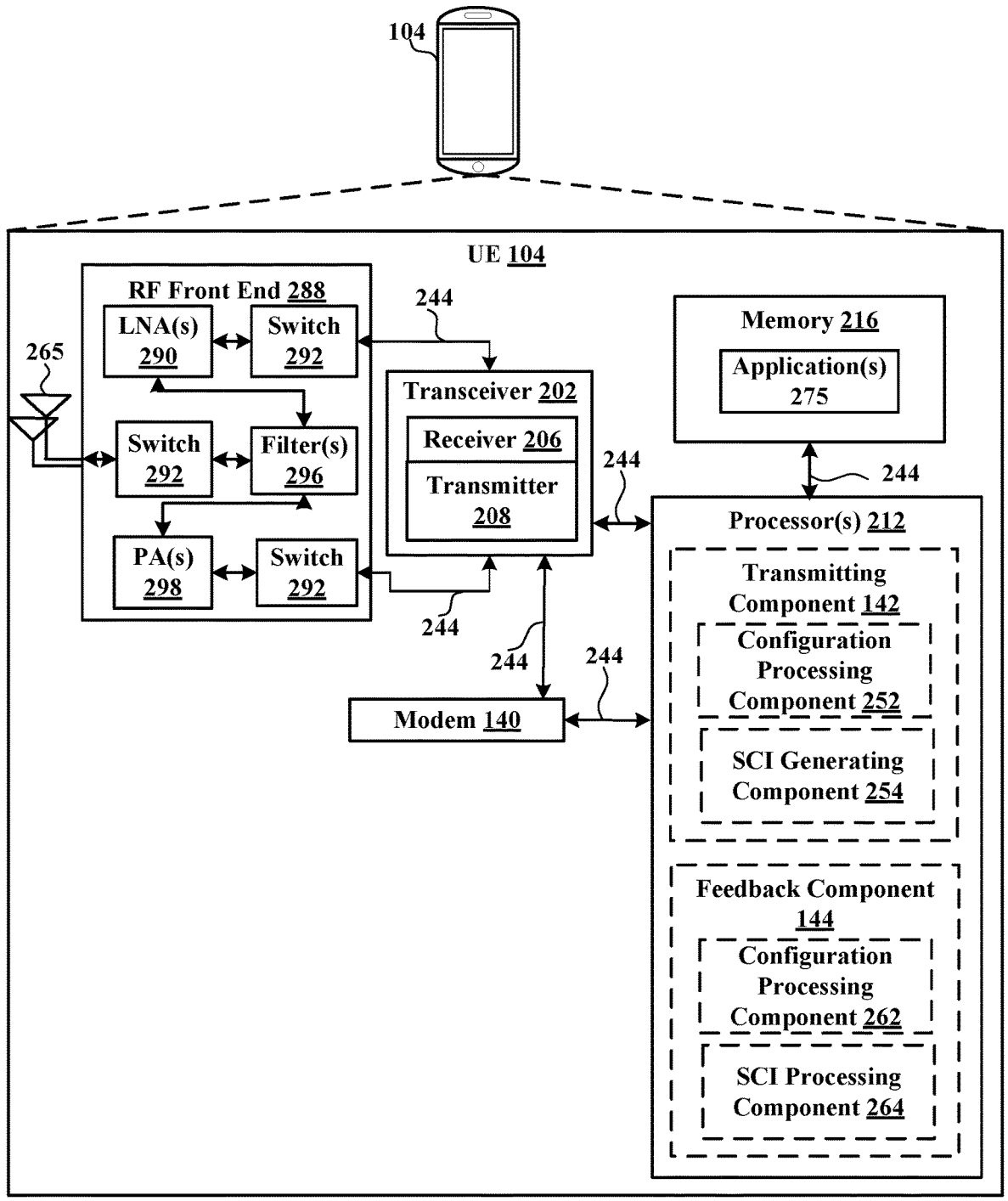
FIG. 2 is a block diagram illustrating an example of a UE, in accordance with various aspects of the present disclosure.
Figure 3:
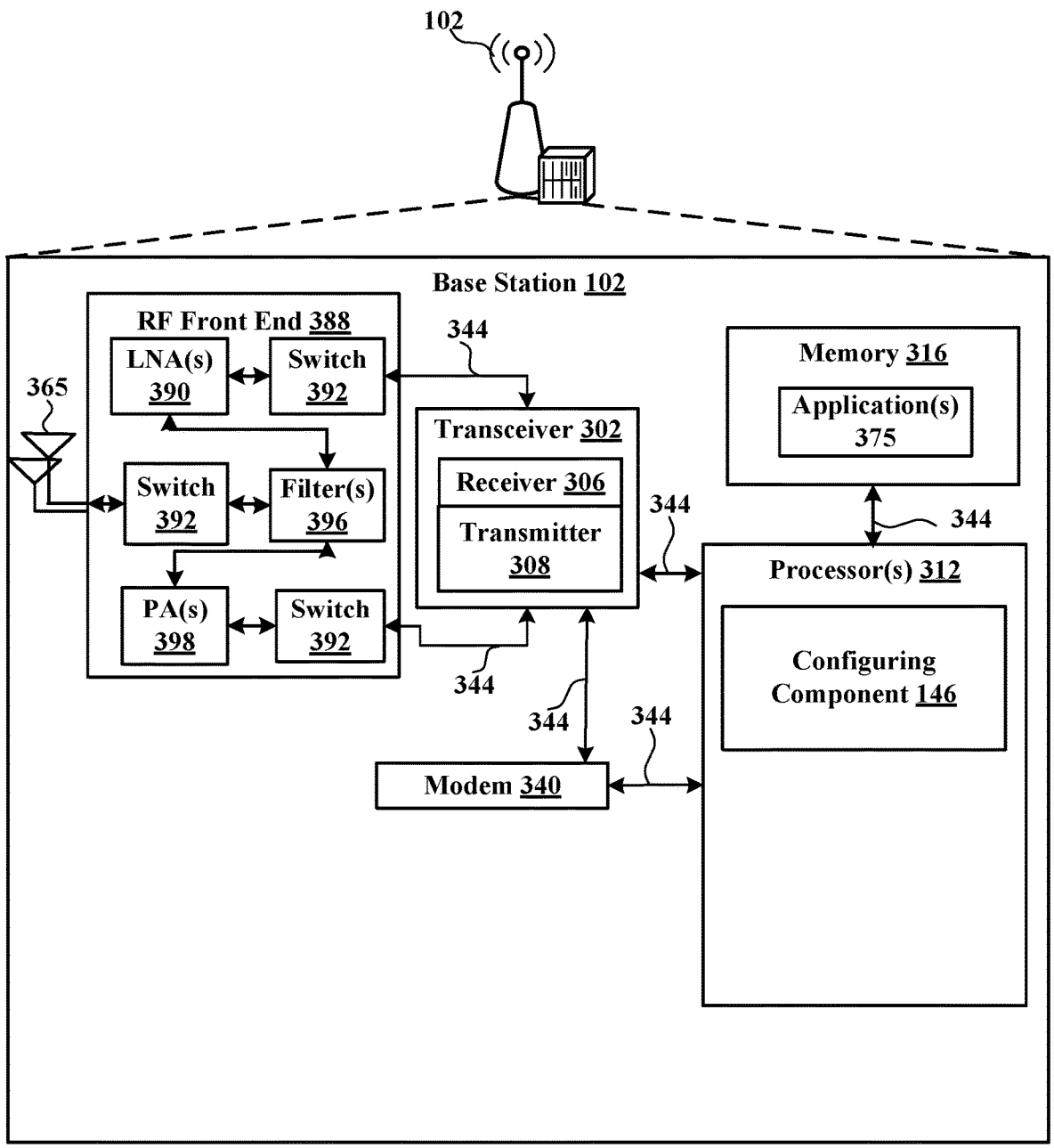
FIG. 3 is a block diagram illustrating an example of a base station, in accordance with various aspects of the present disclosure.
Figure 4:
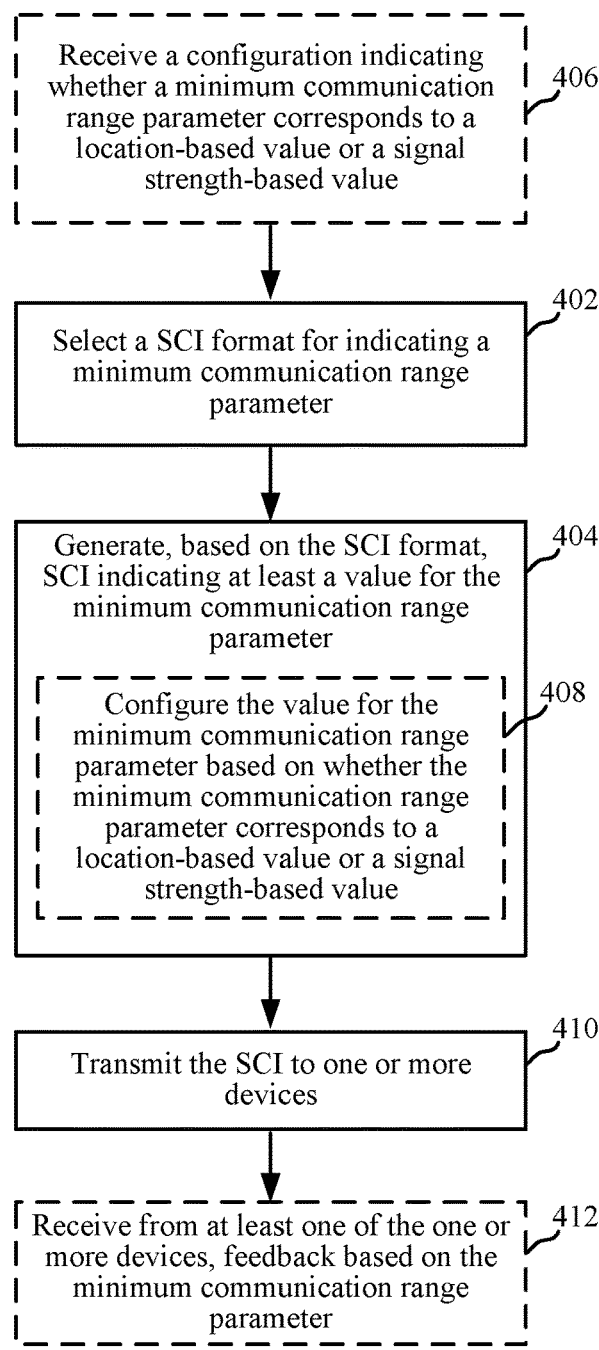
FIG. 4 is a flow chart illustrating an example of a method for transmitting sidelink control information (SCI), in accordance with various aspects of the present disclosure.
Figure 5:
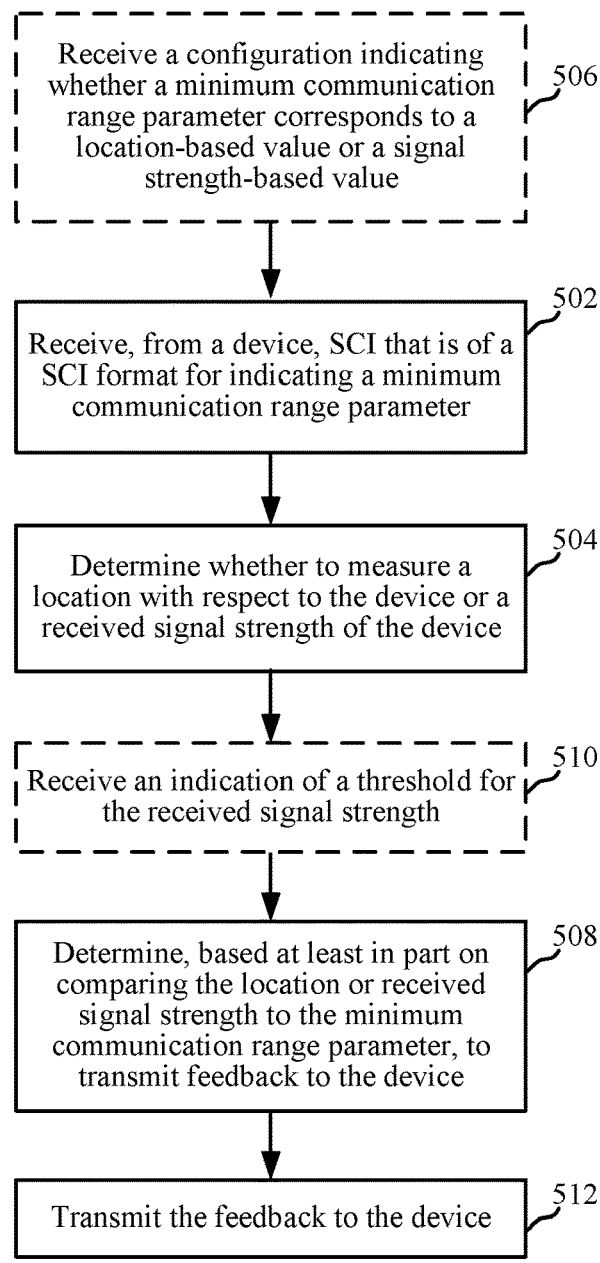
FIG. 5 is a flow chart illustrating an example of a method for transmitting feedback based on SCI, in accordance with various aspects of the present disclosure.
Figure 6:
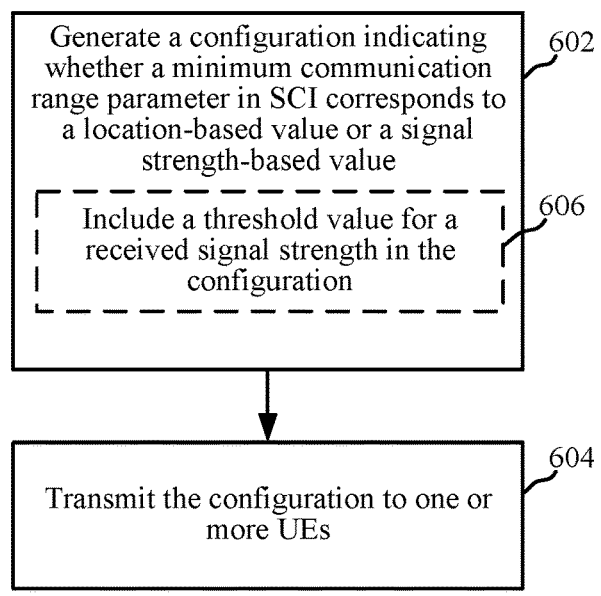
FIG. 6 is a flow chart illustrating an example of a method for configuring a value type for a minimum communication range parameter, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIG. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140, a transmitting component 142 for transmitting sidelink communications to other UE(s), a feedback component 144 for transmitting feedback for sidelink communications from other UE(s), etc., according to one or more of the functions described herein.

In an aspect, the one or more processors 212 can include a modem 140 and/or can be part of the modem 140 that uses one or more modem processors. Thus, the various functions related to transmitting component 142 and/or feedback component 144 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with transmitting component 142 and/or feedback component 144 may be performed by transceiver 202.

Also, memory 216 may be configured to store data used herein and/or local versions of applications 275 or transmitting component 142 and/or feedback component 144 and/or one or more of their subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining transmitting component 142 and/or feedback component 144 and/or one or more of their subcomponents, and/or data associated therewith, when UE 104 is operating at least one processor 212 to execute transmitting component 142 and/or feedback component 144 and/or one or more of their subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, transmitting component 142 can optionally include configuration processing component 252 for processing one or more configurations received from a base station 102 to determine whether to indicate a location-based value or a signal strength-based value for a minimum communication range parameter in SCI, and/or a SCI generating component 254 for generating the SCI to include the value of the minimum communication range parameter for transmitting to one or more other UEs 104. Feedback component 144 can optionally include a configuration processing component 262 for processing one or more configurations received from a base station 102 or another device to determine whether SCI indicates a location-based value or a signal strength-based value for a minimum communication range parameter, and/or a SCI processing component 264 for processing the SCI based on the value to determine parameters for transmitting feedback to one or more UEs from which the SCI is received.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 146 for configuring one or more parameters indicating a value type of a minimum communication range parameter that is transmitted between devices in SCI.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for transmitting SCI. In an example, a UE 104 can perform the functions described in method 400 using one or more of the components described in FIGS. 1-2, such as transmitting component 142 and/or its subcomponents. For example, the UE 104 performing method 400 can be transmitting sidelink communications (e.g., sidelink groupcast) to one or more receiving UEs.

In method 400, at Block 402, a SCI format for indicating a minimum communication range parameter can be selected. In an aspect, SCI generating component 254, e.g., in conjunction with processor(s) 212, memory 216, transceiver 202, transmitting component 142, etc., can select the SCI format for indicating the minimum communication range parameter. For example, the SCI format may be defined in a wireless communication technology (e.g., NR) as a SCI format defined for indicating parameters related to transmitting feedback for sidelink communications. In one example, the SCI format may indicate one or more parameters for determining a coverage range within which a receiving UE can determine to transmit HARQ feedback for the sidelink communication. In one example, the SCI format can be a single SCI format that can be used to indicate the coverage range in terms of a location-based coverage range (e.g., based on TX-RX distance) and/or in terms of a signal strength-based coverage range (e.g., based on RSRP, RSRQ, RSSI, SNR, etc.). In this example, the SCI may have a single coverage range value that can be represented in terms of either a location-based coverage range or in terms of a signal strength-based coverage range. For example, the same SCI format can be used for indicating that feedback for sidelink communications is to be location-based or signal strength-based (or both).

In method 400, at Block 404, SCI indicating at least a value for the minimum communication range parameter can be generated based on the SCI format. In an aspect, SCI generating component 254, e.g., in conjunction with processor(s) 212, memory 216, transceiver 202, transmitting component 142, etc., can generate, based on the SCI format, SCI indicating at least the value for the minimum communication range parameter. In one example, SCI generating component 254 can indicate the value as a location-based value, such as a TX-RX distance parameter as described herein, for causing other UEs to transmit feedback for sidelink communications from UE 104 when within the location (e.g., within a TX-RX distance of the UE 104). For example, one way to achieve location-based (also referred to as distance-based) feedback is to provide the receiver UE(s) with information regarding the transmitter UE 104 location and the reliable communication range. This information can be part of SCI transmitted by the transmitter UE 104. Thus, for example, SCI generating component 254 may generate the SCI to indicate a location of UE 104 and the TX-RX distance within which a receiver UE is to report feedback.

In some examples, however, as location information can be quite large in terms of data size, it may not be desirable to transmit location information in raw format in the SCI. In one example, for the purpose of compression of location information, a Zone Identifier concept, such as that defined for LTE-V2X communications in 3GPP Rel-14, can be used. In this example, instead of transmitting raw location information in the SCI, SCI generating component 254 can generate the SCI to include a subset of least significant bits (LSBs) of Zone ID that defines the location of the transmitter UE 104. Similar to LTE-V2X, the zone size can be a configurable value which can be configured for all the UEs communicating in V2X (e.g., by a base station). In an example, the whole earth is divided into zones, but for the purpose of HARQ feedback the whole zone ID need not be transmitted and a certain number of LSBs (e.g., 10 bits LSB) can be sufficient to distinguish nearby Zone IDs (e.g., as after this, zone IDs can repeat). In any case, based on the location of the transmitter UE 104, as indicated in terms of Zone ID or number LSBs of Zone ID, based on a determination that the minimum communication range parameter is specified in terms of Zone ID, and based on the receiver UE's own Zone ID, the receiver UE can determine whether it is in the minimum communication range and can accordingly determine to transmit NACK feedback or not if it was not able to successfully decode the transmission, as described further herein. In another example, a location-based value may be a quantized step size configured in the SCI, such as a number of meters or other measurement from the location of the transmitter UE 104. In this example, the receiver UE can determine whether it is in the minimum communication range based on the location of the transmitter UE and determining whether the receiver UE location is within the quantized step-size value of the transmitter UE.

In another example, SCI generating component 254 can indicate the value as a signal strength-based value, such as a RSRP, RSRQ, RSSI, SNR, or similar parameter as described herein, for causing other UEs to transmit feedback for sidelink communications from UE 104 when signal strength of the UE 104 (e.g., RSRP, RSRQ, RSSI, SNR, etc.), as measured at the receiving UE, achieves a threshold. In one example, where the SCI has fields for specifying both signal strength-based minimum coverage range and location-based minimum coverage range, the SCI may not use or populate the location-based parameter in the SCI in this example, as the location of the UE may not assist in determining whether to transmit feedback based on RSRP. In any case, for example, from application point of view, actual minimum communication range and RSRP can be quite different with respect to pathloss if the receiving UE is in the line-of-sight (LOS) or not LOS (NLOS) of the transmitting UE 104. This imbalance in pathloss between LOS and NLOS can lead to asymmetric reliability levels for different UEs even if they are in same physical distance but happen to be LOS or NLOS. For example, if a RSRP is set for LOS pathloss, this may result in a small effective communication range in an urban scenario (e.g., due to buildings or other structures causing pathloss). If a RSRP is set for NLOS pathloss, this may result in an excessive effective communication range in direction of LOS. Thus, at least in urban scenarios, RSRP-based feedback may cause feedback from a different set of UEs than location-based, which may not be desirable.

In this regard, in one example, location-based or signal strength-based feedback may be selected for a given area (e.g., for a given base station 102 that can allocated spectrum resources for sidelink communications). In this example, the base station 102 or another device (e.g., the transmitting UE 104) can indicate whether location-based or signal strength-based feedback is to be used. In this example, in method 400, optionally at Block 406, a configuration indicating whether a minimum communication range parameter corresponds to a location-based value or a signal strength-based value can be received. In an aspect, configuration processing component 252, e.g., in conjunction with processor(s) 212, memory 216, transceiver 202, transmitting component 142, etc., can receive the configuration indicating whether the minimum communication range parameter corresponds to the location-based value or the signal strength-based value. For example, configuration processing component 252 can receive the configuration as a radio resource control (RRC) configuration (e.g., from a base station 102) to indicate a value type parameter for the minimum communication range parameter indicating whether the value is location-based or signal strength-based. In this example, SCI generating component 254 can use the same parameter and SCI format in both cases (e.g., where the same parameter or field in the SCI format can support either a location-based minimum coverage range value or a signal strength-based minimum coverage range value), but can determine the value type and accordingly set the value based on the parameter received in the configuration.

In this or other examples, in generating the SCI at Block 404, optionally at Block 408, the value for the minimum communication range parameter can be configured based on whether the minimum communication range parameter corresponds to a location-based value or a signal strength-based value. In an aspect, SCI generating component 254, e.g., in conjunction with processor(s) 212, memory 216, transceiver 202, transmitting component 142, etc., can configure the value for the minimum communication range parameter based on whether the minimum communication range parameter corresponds to a location-based value or a signal strength-based value. For example, where the minimum communication range parameter corresponds to a location-based value, SCI generating component 254 can configure the minimum communication range parameter as a TX-RX distance value (e.g., a number of zones, a listing of Zone IDs or LSBs thereof, a range of Zone IDs or LSBs thereof, a number of meters or other quantized step size, etc., as described) within which a receiving UE is to report feedback for communications from UE 104. In another example, where the minimum communication range parameter corresponds to a signal strength-based value, SCI generating component 254 can configure the minimum communication range parameter as a threshold RSRP by which feedback is to be reported for communications from UE 104 that achieve the threshold RSRP at the receiving UE.

In method 400, at Block 410, the SCI can be transmitted to one or more devices. In an aspect, transmitting component 142, e.g., in conjunction with processor(s) 212, memory 216, transceiver 202, etc., can transmit the SCI to the one or more devices. For example, transmitting component 142 can transmit the SCI over a sidelink channel (e.g., PSCCH, PSSCH, etc.) and using the SCI format. In an example, receiving UEs can transmit feedback for the SCI and/or for other transmissions (e.g., sidelink groupcast) from the UE 104 subsequent to the SCI, where the receiving UE(s) determine themselves to be within the minimum communication range (as determined based on the location-based or signal strength-based parameter(s), as described herein) and/or where the feedback is NACK.

Thus, in an example, in method 400, optionally at Block 412, feedback can be received from at least one of the one or more devices based on the minimum communication range parameter. In an aspect, transmitting component 142, e.g., in conjunction with processor(s) 212, memory 216, transceiver 202, etc., can receive, from at least one of the one or more devices, feedback based on the minimum communication range parameter. Thus, for example, the at least one device can transmit the feedback based on determining that the feedback is NACK and/or based on determining that the at least one device satisfies the minimum communication range parameter, whether location-based or signal strength-based, as described further herein. For example, where NACK is received (e.g., from one or more UEs or a determined number of UEs), transmitting component 142 can determine to retransmit sidelink communications (e.g., sidelink groupcast).

FIG. 5 illustrates a flow chart of an example of a method 500 for transmitting feedback based on SCI. In an example, a UE 104 can perform the functions described in method 500 using one or more of the components described in FIGS. 1-2, such as feedback component 144 and/or its subcomponents. For example, the UE 104 performing method 500 can be receiving sidelink communications (e.g., sidelink groupcast) from a transmitting UE and can determine to transmit feedback for the received sidelink communications.

In method 500, at Block 502, SCI that is of a SCI format for indicating a minimum communication range parameter can be received from a device. In an aspect, SCI processing component 264, e.g., in conjunction with processor(s) 212, memory 216, transceiver 202, feedback component 144, etc., can receive, from the device, the SCI that is of the SCI format for indicating the minimum communication range parameter. For example, the SCI format may be defined in a wireless communication technology (e.g., NR) for indicating parameters related to transmitting feedback for sidelink communications. In one example, the SCI format may indicate one or more parameters for determining a coverage range within which the receiving UE can determine to transmit HARQ feedback for the sidelink communication. In one example, the SCI format can be a single SCI format that can be used to indicate the coverage range in terms of a location-based coverage range (e.g., based on TX-RX distance) and/or in terms of a signal strength-based coverage range (e.g., based on RSRP, RSRQ, RSSI, SNR, etc.). In this example, the SCI may have a single coverage range value that can be represented in terms of either a location-based coverage range or in terms of a signal strength-based coverage range. For example, the same SCI format can be used for indicating that feedback for sidelink communications is to be location-based or signal strength-based (or both).

In method 500, at Block 504, it can be determined whether to measure a location with respect to the device or a received signal strength of the device. In an aspect, SCI processing component 264, e.g., in conjunction with processor(s) 212, memory 216, transceiver 202, feedback component 144, etc., can determine whether to measure a location with respect to the device (the device transmitting the SCI) or to measure a received signal strength of the device. In one example, SCI processing component 264 can determine to perform this determination based on another determination to indicate feedback for communications from the device. For example, SCI processing component 264 may determine to indicate NACK feedback for sidelink communications (e.g., sidelink groupcast) received from the device, and then can accordingly determine whether to measure a location with respect to the device or to measure a received signal strength of the device in determining whether to transmit the NACK feedback. As described, in one example, determining whether to measure a location with respect to the device or to measure a received signal strength of the device can be based on a configured parameter indicating whether to report feedback based on a location-based or signal strength-based determination or indicating whether a single minimum communication range parameter in the SCI, which can be configured as a location-based or signal strength-based minimum coverage range, is location-based or signal strength-based minimum coverage range.

For example, in method 500, optionally at Block 506, a configuration indicating whether a minimum communication range parameter corresponds to a location-based value or a signal strength-based value can be received. In an aspect, configuration processing component 262, e.g., in conjunction with processor(s) 212, memory 216, transceiver 202, feedback component 144, etc., can receive the configuration indicating whether the minimum communication range parameter corresponds to the location-based value or the signal strength-based value. For example, configuration processing component 252 can receive the configuration as a radio resource control (RRC) configuration (e.g., from a base station 102) to indicate a value type parameter for the minimum communication range parameter indicating whether the value is location-based or signal strength-based. In this regard, SCI processing component 264 can accordingly determine whether the value of the minimum communication range parameter received in the SCI is location-based or signal strength-based for determining whether to report feedback.

In method 500, at Block 508, it can be determined to transmit feedback to the device based at least in part on comparing the location or received signal strength to the minimum communication range parameter. In an aspect, feedback component 144, e.g., in conjunction with processor(s) 212, memory 216, transceiver 202, etc., can determine, based at least in part on comparing the location or received signal strength to the minimum communication range parameter, to transmit feedback to the device. For example, where the minimum communication range parameter is determined to be of a location-based value type, feedback component 144 may compare a location-based parameter of the UE 104 with the location-based value indicated by the minimum communication range parameter. For example, feedback component 144 may determine whether a Zone ID of the UE 104 is within a range, listing, or other indication of Zone IDs indicated by the minimum communication range parameter, and if so, may determine to transmit feedback (e.g., additionally based on determining that the feedback is NACK feedback). In another example, where the location-based value is a quantized step size configured in the SCI, feedback component 144 may compare the location based on determining whether the UE 104 is within the step size (e.g., a number of meters) of the transmitting UE (e.g., based on location information of the transmitting UE received in the SCI and a determined location of UE 104).

In another example, where the minimum communication range parameter is determined to be of a signal strength-based value type, feedback component 144 may measure a signal strength-based parameter of the transmitting UE, as received by UE 104, and may compare the signal strength-based measurement with the signal strength-based value indicated by the minimum communication range parameter in the SCI. For example, feedback component 144 may determine whether a RSRP of a signal from the transmitting UE, as received at the UE 104 (e.g., a demodulation reference signal (DM-RS) or other RS related to a sidelink communication), achieves a threshold RSRP indicated by the minimum communication range parameter, and if so, may determine to transmit feedback (e.g., additionally based on determining that the feedback is NACK feedback).

In yet another example, e.g., where the minimum communication range parameter is determined to be of a location-based value type, in method 500, optionally at Block 510, an indication of a threshold for the received signal strength can be received. In an aspect, feedback component 144, e.g., in conjunction with processor(s) 212, memory 216, transceiver 202, etc., can receive the indication of the threshold for the received signal strength. For example, feedback component 144 can receive the indication in a configuration from the base station 102 (e.g., RRC configuration). In this example, feedback component 144 can determine to transmit feedback to the device based on both of determining that the UE 104 is within a location of the transmitting UE as determined from the minimum communication range parameter and determining that the RSRP of the transmitting UE achieves the configured threshold (and/or based on determining that the feedback is NACK feedback). For example, even though location-based (or Zone-based) approach may be used for representing TX-RX distance, it may be possible that, if configured zone size is small, then zone IDs may start repeating in shorter distances and UE may incorrectly assume that it is in the indicated zone. To avoid that situation Zone ID and minimum communication range represented in the form of zone IDs can be transmitted in SCI, as described, and an RRC-configured (or otherwise configured) RSRP (e.g., that may not be transmitted in SCI) can be used in combination to decide if HARQ feedback is to be sent by the UE 104 or not.

In any case, where it is determined to transmit feedback, in method 500, at Block 512, the feedback can be transmitted to the device. In an aspect, feedback component 144, e.g., in conjunction with processor(s) 212, memory 216, transceiver 202, etc., can transmit the feedback to the device (e.g., to the transmitting UE). For example, feedback component 144 can transmit the feedback over PSCCH resources, PSSCH resources, etc., which may be allocated to the UE 104 by the transmitting UE, by a base station 102, and/or the like.

FIG. 6 illustrates a flow chart of an example of a method 600 for configuring parameters for reporting SCI feedback. In an example, a base station 102 can perform the functions described in method 600 using one or more of the components described in FIGS. 1 and 3, such as configuring component 146 and/or its subcomponents.

In method 600, at Block 602, a configuration indicating whether a minimum communication range parameter is SCI corresponds to a location-based value or a signal strength-based value can be generated. In an aspect, configuring component 146, e.g., in conjunction with processor(s) 312, memory 316, transceiver 302, etc., can generate the configuration indicating whether the minimum communication range parameter is SCI corresponds to the location-based value or the signal strength-based value. For example, this parameter can be configured by the network to which the base station 102 is connected and/or specifically for UEs within coverage of (or otherwise initially attaching to) the base station 102. Thus, transmitting UEs receiving the configuration can accordingly configure the minimum communication range parameter in SCI as a location-based or signal strength-based value, as described, and receiving UEs can accordingly determine the value type of the minimum communication range parameter from transmitting UEs as a location-based or signal strength-based value based on the configuration.

In method 600, at Block 604, the configuration can be transmitted to one or more UEs. In an aspect, configuring component 146, e.g., in conjunction with processor(s) 312, memory 316, transceiver 302, etc., can transmit the configuration to one or more UEs. As described, configuring component 146 can transmit the configuration as an RRC configuration, and can accordingly transmit the configuration based on establishing an RRC connection or otherwise in system information, etc.

In one example, in generating the configuration, optionally at Block 606, a threshold value for the received signal strength can be included in the configuration. In an aspect, configuring component 146, e.g., in conjunction with processor(s) 312, memory 316, transceiver 302, etc., can include the threshold value for the received signal strength in the configuration and/or in another configuration transmitted to the UEs. This can allow the UEs to consider signal strength and location-based measurements, as described above, in determining whether to transmit feedback.

Figure 7:
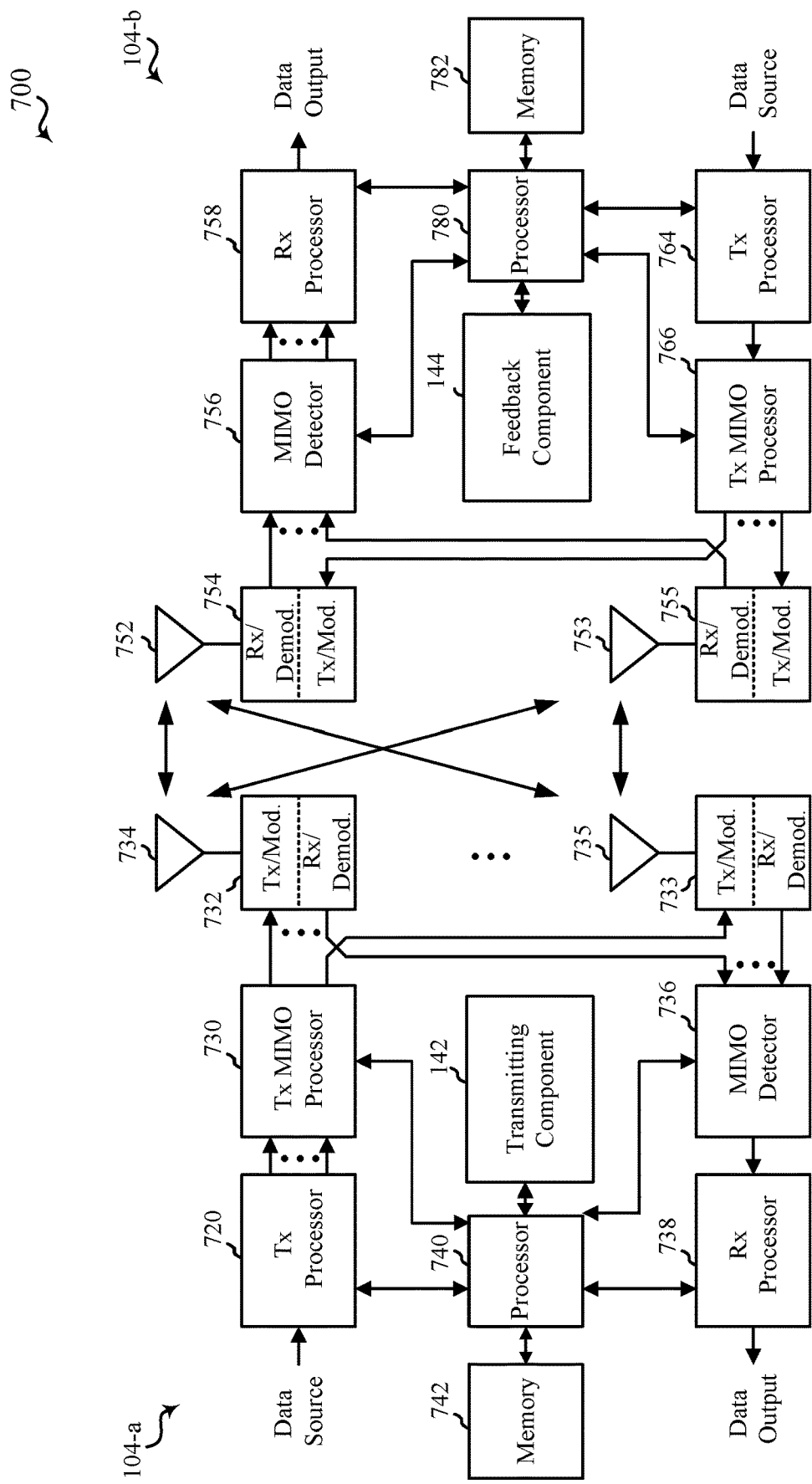
FIG. 7 is a block diagram illustrating an example of a MIMO communication system including a base station and a UE, in accordance with various aspects of the present disclosure.

FIG. 7 is a block diagram of a MIMO communication system 700 including UEs 104-*a*, 104-*b*. The MIMO communication system 700 may illustrate aspects of the wireless communication access network 100 described with reference to FIG. 1. The UE 104-*a* may be an example of aspects of the UE 104 described with reference to FIGS. 1-2. The UE 104-*a* may be equipped with antennas 734 and 735, and the UE 104-*b* may be equipped with antennas 752 and 753. In the MIMO communication system 700, the UEs 104-*a*, 104-*b* may be able to send data over multiple communication links at the same time. Each communication link may be called a "layer" and the "rank" of the communication link may indicate the number of layers used for communication. For example, in a 2×2 MIMO communication system where UE 104-*a* transmits two "layers," the rank of the communication link between the UE 104-*a* and the UE 104-*b* is two.

At the UE 104-*a*, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104-*b* may be an example of aspects of the UEs 104 described with reference to FIGS. 1-2. At the UE 104-*b*, the UE antennas 752 and 753 may receive the signals from the UE 104-*a* (e.g., over a sidelink) and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104-b to a data output, and provide decoded control information to a processor 780, or memory 782.

The processor 780 may in some cases execute stored instructions to instantiate a feedback component 144 (see e.g., FIGS. 1 and 2).

At the UE 104-b, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the UE 104-a in accordance with the communication parameters received from the UE 104-a. At the UE 104-a, the signals from the UE 104-b may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a transmitting component 142 (see e.g., FIGS. 1 and 2).

The components of the UEs 104-a, 104-b may, individually or collectively, be implemented with one or more application specific integrated circuits (ASICs) adapted to perform some or all of the applicable functions in hardware. Each of the noted modules may be a means for performing one or more functions related to operation of the MIMO communication system 700. Similarly, the components of the UE 104-a may, individually or collectively, be implemented with one or more ASICs adapted to perform some or all of the applicable functions in hardware. Each of the noted components may be a means for performing one or more functions related to operation of the MIMO communication system 700.

Some Further Examples

In one example, a method for wireless communication includes selecting a sidelink control information (SCI) format for indicating a minimum communication range parameter, wherein the SCI format is a common format defined for requesting both location-based feedback and signal strength-based feedback, generating, based on the SCI format, SCI indicating a value for the minimum communication range parameter, and transmitting, to one or more devices, the SCI indicating the value for the minimum communication range parameter.

One or more of the above examples can further include receiving a configuration indicating whether the minimum communication range parameter corresponds to a location-based value or a signal strength-based value, and configuring the value for the minimum communication range parameter based on whether the minimum communication range parameter corresponds to the location-based value or the signal strength-based value.

One or more of the above examples can further include wherein the configuration is a radio resource control (RRC) configuration received from a base station.

One or more of the above examples can further include wherein the minimum communication range parameter corresponds to the location-based value, and wherein configuring the SCI comprises indicating a number of zones within which feedback is to be reported.

One or more of the above examples can further include wherein the minimum communication range parameter corresponds to the signal strength-based value, and wherein configuring the SCI comprises indicating a threshold received signal strength for which feedback is to be reported.

In one example a method for wireless communication includes receiving, from a device, SCI that is of a SCI format for indicating a minimum communication range parameter, wherein the SCI format is a common format defined for requesting both location-based feedback and signal strength-based feedback, and wherein the SCI indicates a minimum communication range parameter, determining whether to measure a location with respect to the device or a received signal strength of the device, determining, based at least in part on comparing the location or the received signal strength to the minimum communication range parameter, to transmit feedback to the device, and transmitting the feedback to the device.

One or more of the above examples can further include receiving a configuration indicating whether the minimum communication range parameter corresponds to a location-based value or a signal strength-based value, wherein determining whether to measure the location or the received signal strength is based on the configuration.

One or more of the above examples can further include wherein the configuration is a RRC configuration received from a base station.

One or more of the above examples can further include wherein the minimum communication range parameter corresponds to the location-based value, and wherein determining to transmit feedback is based on determining that the location is within a number of zones indicated by the minimum communication range parameter.

One or more of the above examples can further include wherein determining to transmit feedback is further based on determining that the received signal strength is within a threshold indicated by a different parameter.

One or more of the above examples can further include wherein the different parameter is received in a RRC configuration received from a base station.

One or more of the above examples can further include wherein the minimum communication range parameter corresponds to the signal strength-based value, and wherein determining to transmit feedback is based on determining that the received signal strength is within a threshold indicated by the minimum communication range parameter.

In one example, a method for wireless communication includes generating a configuration indicating whether a minimum communication range parameter in SCI corresponds to a location-based value or a signal strength-based value, and transmitting the configuration to one or more UEs.

One or more of the above examples can further include indicating, in the configuration or in a different configuration, a threshold value for a received signal strength corresponding to reporting feedback for the SCI.

One or more of the above examples can further include wherein transmitting the configuration comprises transmitting a RRC message to the one or more UEs.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
selecting a sidelink control information (SCI) format for indicating a minimum communication range parameter, wherein the SCI format is a common format defined for requesting both location-based feedback and signal strength-based feedback;
generating, based on the SCI format, SCI indicating a value for the minimum communication range parameter; and
transmitting, to one or more devices, the SCI indicating the value for the minimum communication range parameter.

2. The method of example 1, further comprising:
receiving a configuration indicating whether the minimum communication range parameter corresponds to a location-based value or a signal strength-based value; and
configuring the value for the minimum communication range parameter based on whether the minimum communication range parameter corresponds to the location-based value or the signal strength-based value.

3. The method of example 2, further comprising receiving the configuration as a radio resource control (RRC) configuration from a base station.

4. The method of any of examples 2 or 3, wherein the configuration indicates the minimum communication range parameter corresponds to the location-based value, and wherein generating the SCI further includes indicating, in the SCI, a location of a transmitting device.

5. The method of any of examples 2 to 4, wherein the configuration indicates the minimum communication range parameter corresponds to the location-based value, and wherein generating the SCI comprises indicating a number of zones within which feedback is to be reported.

6. The method of any of examples 2 to 5, wherein the configuration indicates the minimum communication range parameter corresponds to the location-based value, and wherein generating the SCI comprises indicating a configured quantized step size within which feedback is to be reported.

7. The method of any of examples 2 to 6, wherein the minimum communication range parameter corresponds to the signal strength-based value, and wherein generating the SCI comprises indicating a threshold received signal strength for which feedback is to be reported.

8. A method for wireless communication, comprising:
receiving, from a device, sidelink control information (SCI) that is of a SCI format for indicating a minimum communication range parameter, wherein the SCI format is a common format defined for requesting both location-based feedback and signal strength-based feedback, and wherein the SCI indicates the minimum communication range parameter;
determining whether to measure a location with respect to the device or a received signal strength of the device;
determining, based at least in part on comparing the location or the received signal strength to a value of the minimum communication range parameter, to transmit feedback to the device; and
transmitting the feedback to the device.

9. The method of example 8, further comprising receiving a configuration indicating whether the minimum communication range parameter corresponds to a location-based value or a signal strength-based value, wherein determining whether to measure the location or the received signal strength is based on the configuration.

10. The method of example 9, further comprising receiving the configuration as a radio resource control (RRC) configuration from a base station.

11. The method of any of examples 9 or 10, wherein the configuration indicates the minimum communication range parameter corresponds to the location-based value, further comprising determining, from the SCI, the location, and wherein comparing the location to the minimum communication range parameter comprises comparing a location parameter of a receiving device to the location of the transmitting device based on the minimum communication range parameter.

12. The method of any of examples 9 to 11, wherein the configuration indicates the minimum communication range parameter corresponds to the location-based value, and wherein determining to transmit feedback is based on determining that the location is within a number of zones indicated by the minimum communication range parameter.

13. The method of any of examples 9 to 12, wherein the configuration indicates the minimum communication range parameter corresponds to the location-based value, and wherein determining to transmit feedback is based on determining that the location is within a configured quantized step size indicated by the minimum communication range parameter.

14. The method of any of examples 9 to 13, wherein the configuration indicates the minimum communication range parameter corresponds to the location-based value, and wherein determining to transmit feedback is further based on determining that the received signal strength is within a threshold indicated by a different parameter.

15. The method of example 14, further comprising receiving, from a base station, the different parameter in a radio resource control (RRC) configuration.

16. The method of any of examples 8 to 15, wherein the minimum communication range parameter corresponds to the signal strength-based value, and wherein determining to transmit feedback is based on determining that the received signal strength is within a threshold indicated by the minimum communication range parameter.

17. An apparatus for wireless communication, comprising:
a transceiver;
a memory configured to store instructions; and one or more processors communicatively coupled with the transceiver and the memory, wherein the one or more processors are configured to perform one or more of the methods in any of examples 1 to 16.

18. An apparatus for wireless communication, comprising means for performing one or more of the methods of any of examples 1 to 16.

19. A computer-readable medium, comprising code executable by one or more processors for wireless communications, the code comprising code for performing one or more of the methods of any of examples 1 to 16.

What is claimed is:

1. A method for wireless communication, comprising:
selecting a sidelink control information (SCI) format for indicating a minimum communication range parameter, wherein the SCI format is a common format defined for requesting both location-based feedback and signal strength-based feedback;
generating, based on the SCI format, SCI indicating a value for the minimum communication range parameter; and
transmitting, to one or more devices, the SCI indicating the value for the minimum communication range parameter.

2. The method of claim 1, further comprising:
receiving a configuration indicating whether the minimum communication range parameter corresponds to a location-based value or a signal strength-based value; and
configuring the value for the minimum communication range parameter based on whether the minimum communication range parameter corresponds to the location-based value or the signal strength-based value.

3. The method of claim 2, further comprising receiving the configuration as a radio resource control (RRC) configuration from a base station.

4. The method of claim 2, wherein the configuration indicates the minimum communication range parameter corresponds to the location-based value, and wherein generating the SCI further includes indicating, in the SCI, a location of a transmitting device.

5. The method of claim 2, wherein the configuration indicates the minimum communication range parameter corresponds to the location-based value, and wherein generating the SCI comprises indicating a number of zones within which feedback is to be reported.

6. The method of claim 2, wherein the configuration indicates the minimum communication range parameter corresponds to the location-based value, and wherein generating the SCI comprises indicating a configured quantized step size within which feedback is to be reported.

7. The method of claim 2, wherein the minimum communication range parameter corresponds to the signal strength-based value, and wherein generating the SCI comprises indicating a threshold received signal strength for which feedback is to be reported.

8. A method for wireless communication, comprising:
receiving, from a device, sidelink control information (SCI) that is of a SCI format for indicating a minimum communication range parameter, wherein the SCI format is a common format defined for requesting both location-based feedback and signal strength-based feedback, and wherein the SCI indicates the minimum communication range parameter;
determining whether to measure a location with respect to the device or a received signal strength of the device;
determining, based at least in part on comparing the location or the received signal strength to a value of the minimum communication range parameter, to transmit feedback to the device; and
transmitting the feedback to the device.

9. The method of claim 8, further comprising receiving a configuration indicating whether the minimum communication range parameter corresponds to a location-based value or a signal strength-based value, wherein determining whether to measure the location or the received signal strength is based on the configuration.

10. The method of claim 9, further comprising receiving the configuration as a radio resource control (RRC) configuration from a base station.

11. The method of claim 9, wherein the configuration indicates the minimum communication range parameter corresponds to the location-based value, further comprising determining, from the SCI, the location, and wherein comparing the location to the minimum communication range parameter comprises comparing a location parameter of a receiving device to the location of the transmitting device based on the minimum communication range parameter.

12. The method of claim 9, wherein the configuration indicates the minimum communication range parameter corresponds to the location-based value, and wherein determining to transmit feedback is based on determining that the location is within a number of zones indicated by the minimum communication range parameter.

13. The method of claim 9, wherein the configuration indicates the minimum communication range parameter corresponds to the location-based value, and wherein determining to transmit feedback is based on determining that the location is within a configured quantized step size indicated by the minimum communication range parameter.

14. The method of claim 9, wherein the configuration indicates the minimum communication range parameter corresponds to the location-based value, and wherein determining to transmit feedback is further based on determining that the received signal strength is within a threshold indicated by a different parameter.

15. The method of claim 14, further comprising receiving, from a base station, the different parameter in a radio resource control (RRC) configuration.

16. The method of claim 8, wherein the minimum communication range parameter corresponds to the signal strength-based value, and wherein determining to transmit feedback is based on determining that the received signal strength is within a threshold indicated by the minimum communication range parameter.

17. An apparatus for wireless communication, comprising:
a transceiver;
a memory configured to store instructions; and
one or more processors communicatively coupled with the transceiver and the memory, wherein the one or more processors are configured to:
select a sidelink control information (SCI) format for indicating a minimum communication range parameter, wherein the SCI format is a common format defined for requesting both location-based feedback and signal strength-based feedback;
generate, based on the SCI format, SCI indicating a value for the minimum communication range parameter; and
transmit, to one or more devices, the SCI indicating the value for the minimum communication range parameter.

18. The apparatus of claim 17, wherein the one or more processors are further configured to:
receive a configuration indicating whether the minimum communication range parameter corresponds to a location-based value or a signal strength-based value; and
configure the value for the minimum communication range parameter based on whether the minimum communication range parameter corresponds to the location-based value or the signal strength-based value.

19. The apparatus of claim 18, wherein the one or more processors are further configured to receive the configuration as a radio resource control (RRC) configuration from a base station.

20. The apparatus of claim 18, wherein the configuration indicates the minimum communication range parameter corresponds to the location-based value, and wherein the one or more processors are configured to generate the SCI at least in part by indicating, in the SCI, a location of a transmitting device.

21. The apparatus of claim 18, wherein the configuration indicates the minimum communication range parameter corresponds to the location-based value, and wherein the one or more processors are configured to generate the SCI at least in part by indicating a number of zones or a configured quantized step size within which feedback is to be reported.

22. The apparatus of claim 18, wherein the minimum communication range parameter corresponds to the signal strength-based value, and wherein the one or more processors are configured to generate the SCI at least in part by indicating a threshold received signal strength for which feedback is to be reported.

23. An apparatus for wireless communication, comprising:
a transceiver;
a memory configured to store instructions; and
one or more processors communicatively coupled with the transceiver and the memory, wherein the one or more processors are configured to:
receive, from a device, sidelink control information (SCI) that is of a SCI format for indicating a minimum communication range parameter, wherein the SCI format is a common format defined for requesting both location-based feedback and signal strength-based feedback, and wherein the SCI indicates the minimum communication range parameter;
determine whether to measure a location with respect to the device or a received signal strength of the device;
determine, based at least in part on comparing the location or the received signal strength to a value of the minimum communication range parameter, to transmit feedback to the device; and
transmit the feedback to the device.

24. The apparatus of claim 23, wherein the one or more processors are further configured to receive a configuration indicating whether the minimum communication range parameter corresponds to a location-based value or a signal strength-based value, wherein the one or more processors are configured to determine whether to measure the location or the received signal strength based on the configuration.

25. The apparatus of claim 24, wherein the one or more processors are further configured to receive the configuration as a radio resource control (RRC) configuration from a base station.

26. The apparatus of claim 24, wherein the configuration indicates the minimum communication range parameter corresponds to the location-based value, further comprising determining, from the SCI, the location, and wherein the one or more processors are configured to compare the location to the minimum communication range parameter at least in part by comparing a location parameter of a receiving device to the location of the transmitting device based on the minimum communication range parameter.

27. The apparatus of claim 24, wherein the configuration indicates the minimum communication range parameter corresponds to the location-based value, and wherein the one or more processors are configured to determine to transmit feedback based on determining that the location is within a number of zones or a configured quantized step size indicated by the minimum communication range parameter.

28. The apparatus of claim 24, wherein the configuration indicates the minimum communication range parameter corresponds to the location-based value, and wherein the one or more processors are configured to determine to transmit feedback further based on determining that the received signal strength is within a threshold indicated by a different parameter.

29. The apparatus of claim 28, wherein the one or more processors are further configured to receive, from a base station, the different parameter in a radio resource control (RRC) configuration.

30. The apparatus of claim 24, wherein the minimum communication range parameter corresponds to the signal strength-based value, and wherein the one or more processors are configured to determine to transmit feedback based on determining that the received signal strength is within a threshold indicated by the minimum communication range parameter.

\* \* \* \* \*